May 24, 1932.  W. B. STOUT  1,859,807
AIRPLANE
Filed March 28, 1930   3 Sheets-Sheet 1
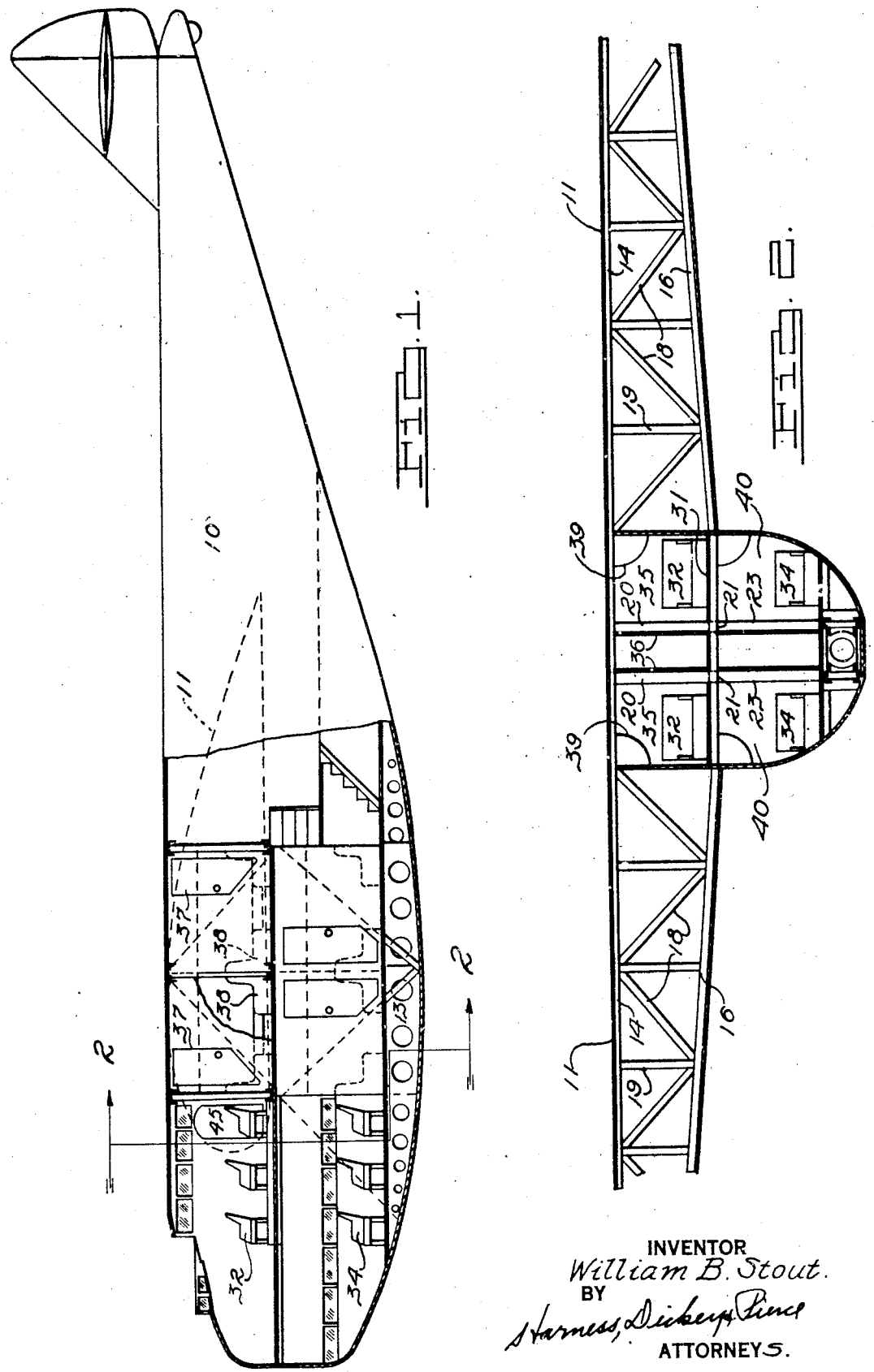
INVENTOR
William B. Stout.
BY
Harness, Dickey & Pierce
ATTORNEYS.

May 24, 1932.  W. B. STOUT  1,859,807
AIRPLANE
Filed March 28, 1930  3 Sheets-Sheet 2
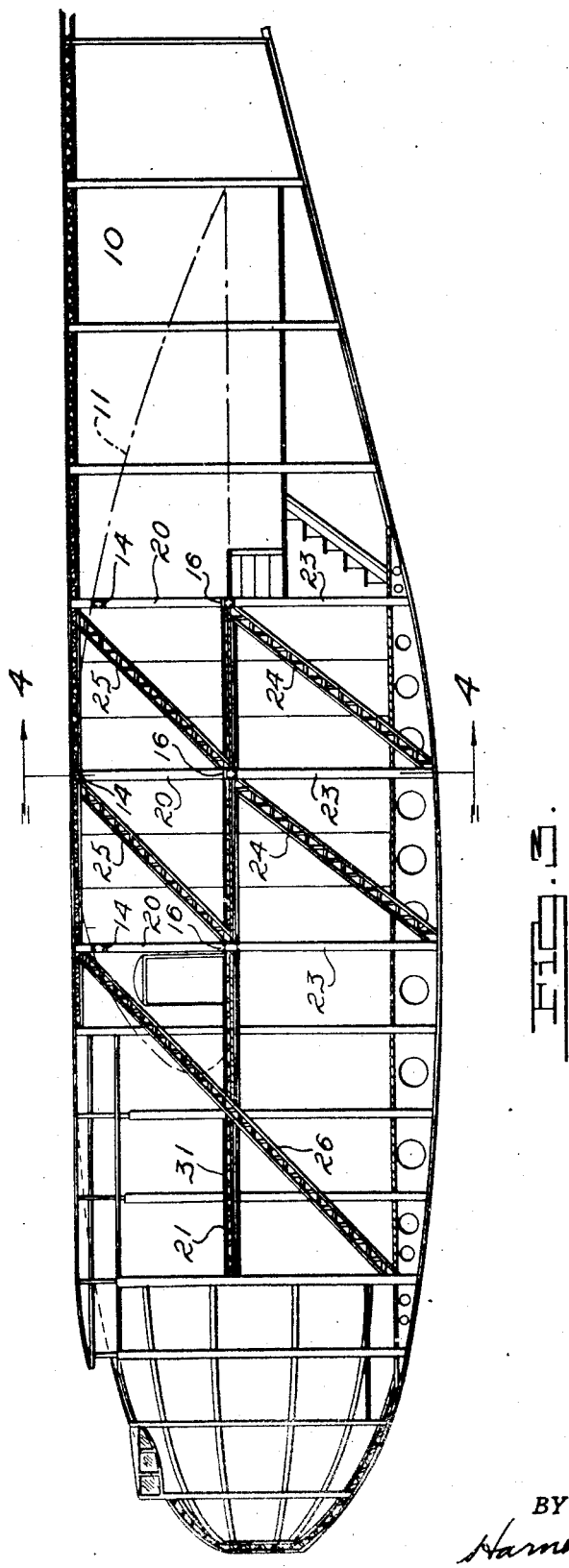
INVENTOR
William B. Stout
BY
Harness, Dickey & Pierce
ATTORNEYS.

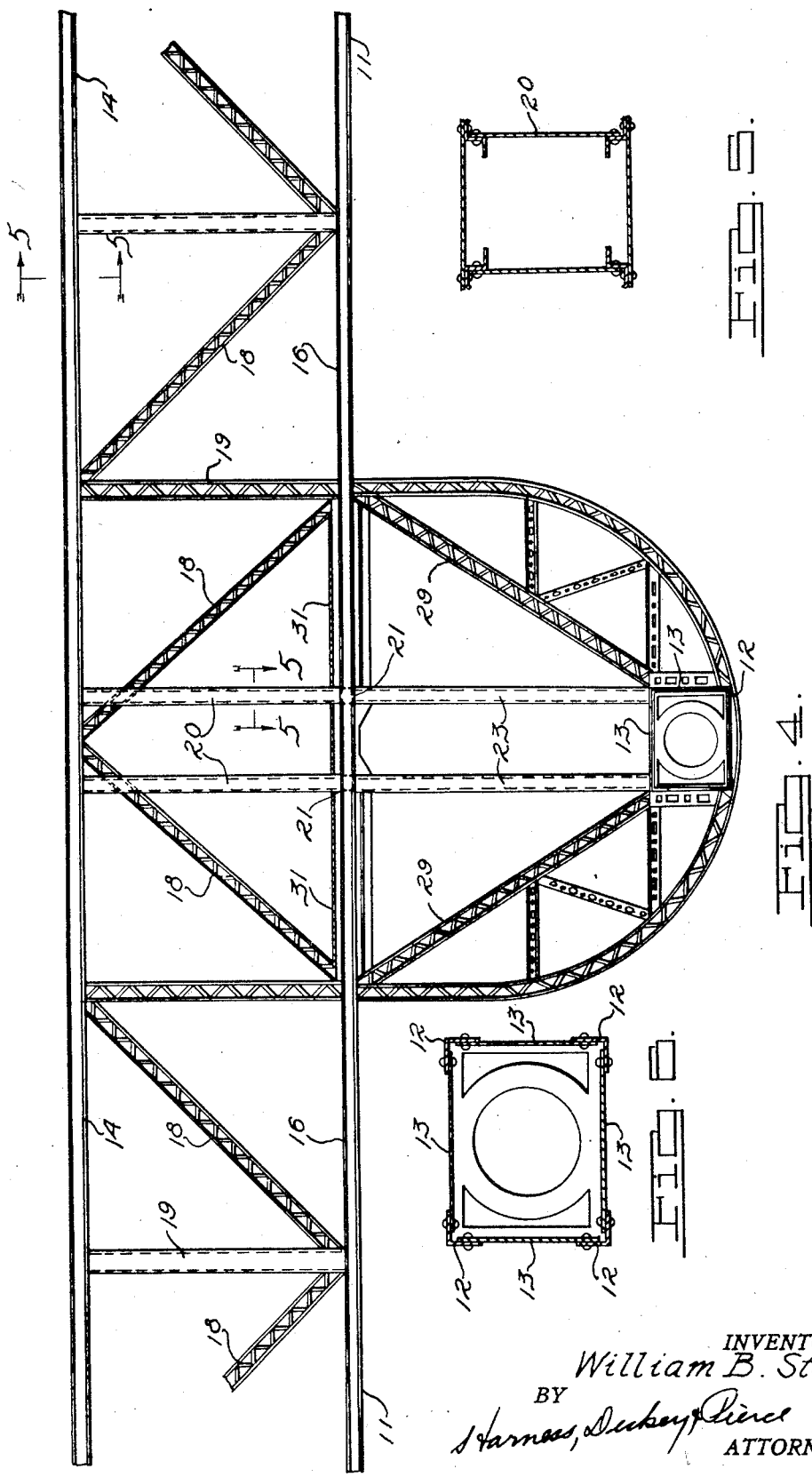

Patented May 24, 1932

1,859,807

UNITED STATES PATENT OFFICE

WILLIAM B. STOUT, OF DETROIT, MICHIGAN

AIRPLANE

Application filed March 28, 1930. Serial No. 439,784.

This invention relates to airplanes and has particular reference to the fuselage thereof, the principal object being the provision of a new and novel design incorporating certain safety and other features.

Another object is to provide an airplane fuselage with a beam-like keel structure for taking impact forces that may be set up through the contact of the fuselage with the ground or other objects in landing.

Another object is to provide an airplane having a fuselage and wings, the fuselage being provided with a keel, and means being provided for the direct transmittal of stresses between the wings and the keel.

Another object is to provide an airplane fuselage with a keel and with compression members directly connecting the spars of the wings with the keel.

Another object is the provision of means for preventing the weight of the engines of an airplane when supported in or by the wings from crushing the fuselage upon impact of the fuselage with the ground.

Another object is to provide a construction for large airplanes particularly suitable for commercial passenger transportation.

Another object is to provide an airplane in which the fuselage is provided with a plurality of superposed floors.

Another object is to provide an airplane as above described in which the upper floor in advance of the foremost main spar is substantially free of bracing obstructions.

Another object is to provide an airplane in which the spars are continuous throughout substantially the span of the wings, the lower members of the spars within the fuselage serving as a floor supporting means.

Another object is to provide a construction for airplanes in which certain members are provided primarily for increasing the safety factor of the airplane under impacts with the ground, and which members are made to serve other and useful purposes in addition to their primary purposes.

Another object is to provide an airplane including a fuselage and deep sectioned wings so constructed and proportioned as to permit the provision of sleeping berths within the fuselage between the upper and lower limits of the wing and between adjacent spars.

Another object is to provide an airplane having superposed floors and sleeping berths on each of said floors between the fore and aft limits of the wings.

A further object is to provide certain novel details of construction that will be specifically pointed out or will be obvious in the following specification.

The above being among the objects of the present invention, same consists in certain novel features of construction and combinations of parts to be hereinafter described with reference to the accompanying drawings, and then claimed, having the above and other objects in view.

In the accompanying drawings, which illustrate the suitable embodiment of the present invention, and in which like numerals refer to like parts throughout the several different views, Fig. 1 is a more or less diagrammatic partially broken side elevation of an airplane.

Fig. 2 is a fragmentary sectional view taken on the line 2—2 of Fig. 1.

Fig. 3 is an enlarged vertical sectional view taken through the longitudinal axis of the fuselage and illustrating the construction of the forward portion of the fuselage.

Fig. 4 is a vertical sectional view taken transversely of the fuselage shown in Fig. 3 as on line 4—4 of Fig. 3.

Fig. 5 is an enlarged sectional view taken either transversely through one of the compression members positioned between the keel and the wing spars, or through one of the main spar members, as on the lines 5—5 of Fig. 4.

Fig. 6 is an enlarged sectional view taken transversely through the keel.

Airplanes as heretofore constructed have incorporated no special provision, as far as I am aware, for resisting in the fuselage itself the impact stresses which may be set up in the fuselage upon contact of the fuselage with the ground. In fact, as far as I am aware, no serious account has been taken of this possibility in designing the fuselage. It is common knowledge that such forces are set up in forced landings and like circumstances where the landing gear is torn loose from the fuselage. Furthermore, it is well known that, barring subsequent fire, if the fuselage were sufficiently strong to withstand such impact forces without crushing, the fatalities resulting from such causes would be largely overcome.

The provision of a specific means for resisting such impact forces on the fuselage is particularly important where the engines are supported by or in the wings of the fuselage, for in such case the weight of the engines increases the impact forces on the fuselage and further tends to crush the same. In accordance with the present invention I provide a novel means specifically designed to resist impact forces on the fuselage arising from causes as above explained, and I so arrange these means that they not only serve this purpose, but also serve as usual or necessary structural parts of the airplane, thus making them serve a dual purpose.

When the airplane is of extremely large size, and particularly where it is of a size sufficient to carry twenty-five or more passengers, safety is of prime importance and in such types of airplanes the above referred to means may be supplemented with additional means which may further serve as a second floor superposed above the usual floor. Furthermore, by a suitable utilization of this additional means I am enabled to provide a lounging room in the nose of the fuselage which is substantially free of bracing obstructions, thus making the room ideally responsive for its purpose.

In accordance with the further object of the present invention in such large airplanes, I preferably so form the wings that the spars extend continuously throughout substantially the span of the wings and are so spaced transversely of the wings as to provide ample room for sleeping berths between them.

Referring to the accompanying drawings, and particularly to Figs. 1 and 2, I show an airplane having a fuselage indicated generally as at 10 and wings indicated generally as at 11. In general, except for the added features hereinafter described, the framework for the fuselage may be of any conventional or suitable design. However, in addition to the usual framework I provide in the bottom of the fuselage and extending longitudinally thereof a keel of beam-like construction best shown in Figs. 3 and 4. This keel may extend the full length of the fuselage if desired but I prefer to terminate it in the general neighborhood of the rear edge of the wings, as the strength in the fuselage required for passengers' safety will ordinarily be limited to that portion of the fuselage in advance of the rear edge of the wings.

The particular keel shown comprises angle members 12 arranged to approximate a box section and connected to each other at the sides, top and bottom by sheet members 13, thus forming a beam or girder of box-like structure having maximum bending resisting qualities and of minimum weight for its strength.

It will be obvious from the following description that this keel member need not be constructed in the same manner as shown in order to realize its beneficial characteristics, but any other suitable form of structure may be employed, or more than one of such structures may be employed to effect the same result, and it is to be understood in the following description and claims that where a keel member is called for it may be made up either as a single member or as a plurality of co-operating members.

The wings are formed with a plurality of main spars which are preferably continuous from the tip of one wing to the tip of the other. Three of these spars are shown in the drawings for a reason that will be hereinafter pointed out. As best shown in Figs. 4 and 5, each spar may be made up of a pair of vertically spaced hollow beam or girder members 14 and 16 respectively connected together by lattice members such as 18. The wings are also provided with suitable rib members indicated generally as at 19. The girder members 14 and 16 of the main spars are connected together vertically, adjacent the center of the fuselage, by a pair of compression members 20 which are preferably of square section as indicated in Fig. 5 and are spaced from each other longitudinally of the wings a sufficient distance to provide a passageway between them. The diagonal lattice members 18 of the main spars do not extend between the compression members 20 but the space between these members is completely unobstructed by any bracing means between the top and bottom members 14 and 16 respectively. The depth of the wings 11 is preferably such as to permit an average individual to stand upright between the top and bottom limits of the wing.

Structurally united with the main spars and extending longitudinally of the fuselage in alignment with the compression members 20 at substantially the same level as the lower beams 16 of the main spars are a pair of girder members 21. These girder members preferably extend from the rearmost main spar forwardly thereof to a point well within the nose of the fuselage. Compression members 23 of the same construction as the compression members 20 and in alignment with the compression members 20 connect these girders directly with the keel. Diagonal bracing 24, preferably of latticed construction as shown, is also provided between these girders and the keel and are preferably located in the same vertical plane as the girders. The lattice members 24 connecting the spars with the keel preferably extend directly to the bottom angle members 12 of the keel. Similar lattice members 25 are also preferably provided between the center main spar and the adjacent spars, these members 25 lying in the same vertical plane as the compression members 20. One diagonal girder 26 is preferably provided in the same vertical plane as each of the girders 21 between the upper beam 14 of the foremost main spar and the forward end of the keel. Diagonal bracing members 29 are also preferably provided between each main spar and the keel and lying in the vertical plane of their corresponding spar members as indicated in Fig. 4.

The effect of the construction thus far described is to provide a means whereby any forces acting upon the wings are transmitted directly to the keel independently of the usual frame work for the fuselage. This construction is designed particularly to prevent the weight or impact forces in the wings from crushing the fuselage upon direct contact of the fuselage with the ground, as in such cases the forces are transmitted through members of ample strength directly to the keel, which is provided specifically for resisting such impact forces. It will be apparent, however, that substantially all of these members further serve the capacity as parts usually employed as structurally necessary parts of airplanes, or else serve an additional purpose in the particular construction shown. The construction is particularly valuable where engines are supported in or by the wings for in such case upon impact with the ground the weight of the engines greatly increases the stresses which must be transmitted through the fuselage to the keel.

Where the airplane is sufficiently large I provide on substantially the same level as the lower edge of the wings a floor 31, and this floor may be supported both by the beam members 16 of the main spars and also by the girders 21. This floor 31 is substantially free of bracing restrictions in advance of the forward main spar and consequently may be provided with seats such as 32 (see Figs. 1 and 2) or other furniture enabling it to be employed as an observation or lounging room. A second floor 33 is provided immediately above the keel and may be employed for a lounging or smoking room, or for any other suitable purpose, seats such as 34 being provided therein if desired.

Where the airplane is of sufficient size to permit, I space the main spars longitudinally of the airplane by a distance slightly greater than the height of the average person, and in the fuselage between each pair of these spars I provide a compartment such as 35 on either side of the compression members 20 and I connect the compression members 20 by a partition 36 provided with a door such as 37 leading thereinto from the aisle thus provided between the compression members. Within each compartment 35 I prefer to provide a pair of opposed seats 38 in much the same manner as in a "Pullman" sleeping car so that the cushions thereof may be easily arranged to provide a bed. An additional bed 39 may be pivotally secured to the upper walls of the fuselage withing each compartment in much the same manner as the upper berth in a "Pullman" sleeping car. I also provide similar compartments 40 between the upper floor 31 and the lower floor 33 between the compression members 20 and in vertical alignment with the upper compartments 35.

If the airplane is of sufficient size additional sleeping or power plant quarters may be provided within the wings proper laterally beyond the fuselage, and in such case doorways such as 45 may be provided leading into the wings from the fuselage from the forward upper compartment as indicated in the drawings. Where such compartments are to be employed as sleeping quarters they may be arranged in a manner similar to those shown.

From the foregoing it will be apparent that I have provided a construction for airplanes insuring maximum safety to the passengers, particularly where the airplane is of large size, and where of such a size a novel arrangement of parts whereby a maximum proportion of the space may be utilized for passenger accommodation.

Formal changes may be made in the specific embodiment of the invention described without departing from the spirit and substance of the broad invention, the scope of which is commensurate with the appended claims.

What I claim is:

1. In an airplane, in combination, a fuselage having a keel built into the lower part thereof for resisting impact forces, wings having longitudinal spars therein, an engine supported by said spars, and means for transmitting impact forces acting on said engine to said keel independently of said fuselage.

2. In an airplane, in combination, a fuselage having a keel built into the lower part thereof for resisting impact forces, wings having longitudinal spars therein, an engine supported by said spars, and means for transmitting impact forces acting on said engine to said keel independently of said fuselage comprising compression and tension members connecting said spars directly to said keel.

3. In an airplane, in combination, a fuselage provided with a pair of superposed floors therein, wings secured to said fuselage at a point materially rearwardly of the nose thereof, spars for said wings, a keel built into said fuselage, diagonal bracing between said wings and keel, and diagonal bracing between the upper of said floors and said keel, said upper floor between said nose and the foremost of said spars being substantially free of diagonal bracings.

4. In an airplane, in combination, a fuselage, a girder-like keel therefor, wings projecting outwardly from either side of said fuselage, the lower surface of said wings being located substantially midway between the top and bottom limits of said fuselage, spars for said wings, compression members connecting said spars and said keel, sleeping berths arranged between said spars within the top and bottom limits thereof, and other sleeping berths arranged below said wings within the fore and aft spacing of said compression members.

5. In combination, an airplane fuselage comprising an outer frame work, a rigid longitudinally extending keel beam disposed within the lower portion of the fuselage, wings extending laterally from the fuselage, spars in the wings extending longitudinally thereof, vertical columns disposed in the fuselage and directly connecting the spars with the keel in such manner as to transmit compression forces directly from the spars to the keel independently of the fuselage framework.

6. In combination, an airplane fuselage comprising an outer frame work, a rigid longitudinally extending keel beam disposed within the lower portion of the fuselage, wings extending laterally from the fuselage, spars in the wings extending longitudinally thereof, vertical columns disposed in the fuselage and directly connecting the spars with the keel in such manner as to transmit compression forces directly from the spars to the keel, and diagonal braces disposed within the fuselage and directly connecting the keel and the spars.

7. In combination, an airplane fuselage comprising an outer frame work, a rigid longitudinally extending keel beam within the lower portion of the fuselage, transversely extending wings secured to the upper portion of the fuselage, wing spars extending longitudinally of the wings, pairs of transversely spaced vertical columns directly connecting the spars with the keel beam and braces secured to the spars and extending diagonally downwardly in a plane transverse of the fuselage and connected at their lower end to the keel beam, the columns forming aisle ways extending longitudinally of the fuselage and the columns together with the diagonally extending brace forming bays within the fuselage.

8. In combination, an airplane fuselage comprising an outer frame work, a rigid longitudinally extending keel beam within the lower portion of the fuselage, transversely extending wings secured to the upper portion of the fuselage, wing spars extending longitudinally of the wings, pairs of transversely spaced columns vertically disposed directly connecting the spars with the keel beam and braces secured to the spars and extending diagonally downwardly in a plane transverse of the fuselage and connected at their lower ends to the keel beam, the columns forming aisle ways extending longitudinally of the fuselage and the columns together with the diagonally extending members forming bays within the fuselage, the columns and the diagonal members being adapted to transmit the weight of the wing spars directly to the keel independently of the outer frame work of the fuselage.

WILLIAM B. STOUT.